United States Patent
Wei et al.

(10) Patent No.: US 9,621,263 B2
(45) Date of Patent: Apr. 11, 2017

(54) METHOD, APPARATUS, NODE DEVICE AND NETWORK SYSTEM FOR DETECTING OPTICAL SIGNAL-TO-NOISE RATIO

(71) Applicant: Huawei Technologies Co., Ltd., Shenzhen, Guangdong (CN)

(72) Inventors: Yijia Wei, Chengdu (CN); Juan Ni, Shenzhen (CN); Zhiyong Feng, Shenzhen (CN); Ning Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/493,540

(22) Filed: Sep. 23, 2014

(65) Prior Publication Data
US 2015/0010299 A1    Jan. 8, 2015

Related U.S. Application Data

(63) Continuation of application No. PCT/CN2012/072951, filed on Mar. 23, 2012.

(51) Int. Cl.
*H04B 10/079* (2013.01)
*H04B 10/077* (2013.01)

(52) U.S. Cl.
CPC ... *H04B 10/07953* (2013.01); *H04B 10/0775* (2013.01); *H04B 2210/075* (2013.01)

(58) Field of Classification Search
CPC .............. H04B 10/07953; H04B 10/69; H04B 10/0775; H04B 10/60
See application file for complete search history.

(56) References Cited

U.S. PATENT DOCUMENTS

| | | |
|---|---|---|
| 5,808,787 A | 9/1998 | Meli et al. |
| 6,433,864 B1 | 8/2002 | Chung et al. |

(Continued)

FOREIGN PATENT DOCUMENTS

| | | |
|---|---|---|
| CN | 102231644 A | 11/2011 |
| EP | 0 554 126 A1 | 1/1993 |

(Continued)

OTHER PUBLICATIONS

"Optical monitoring for dense wavelength division multiplexing systems", ITU-T G.697, Feb. 2012, 37 pages.

(Continued)

*Primary Examiner* — David Payne
*Assistant Examiner* — Casey Kretzer

(57) ABSTRACT

The present invention discloses a method and an apparatus for detecting an optical signal-to-noise ratio, a node device, and a network system. The method includes: receiving a detected optical signal carrying amplified spontaneous emission ASE noise; detecting a first alternating current component and a first direct current component of the detected optical signal; acquiring first modulation information of the detected optical signal; acquiring first correction information corresponding to the first modulation information according to the first modulation information; and determining an optical signal-to-noise ratio OSNR of the detected optical signal according to the first alternating current component, the first direct current component, and the first correction information.

19 Claims, 10 Drawing Sheets

(56) References Cited

U.S. PATENT DOCUMENTS

| | | | |
|---|---|---|---|
| 6,952,529 B1 | 10/2005 | Mittal | |
| 7,336,728 B2 | 2/2008 | Dorrer et al. | |
| 8,073,343 B2 | 12/2011 | Yuki et al. | |
| 2003/0169480 A1* | 9/2003 | Inoue | H01S 3/302 359/334 |
| 2004/0126108 A1 | 7/2004 | Chung et al. | |
| 2004/0156038 A1* | 8/2004 | Cao | G01J 1/4257 356/73.1 |
| 2004/0223769 A1 | 11/2004 | Hoshida | |
| 2007/0009264 A1* | 1/2007 | Kamio | H04B 10/505 398/102 |
| 2008/0131116 A1 | 6/2008 | Nakamura | |
| 2011/0076011 A1* | 3/2011 | Kagawa | H04B 10/07951 398/16 |
| 2012/0106951 A1* | 5/2012 | Wan | H04B 10/0775 398/26 |
| 2012/0224851 A1* | 9/2012 | Takara | H04B 10/0793 398/45 |
| 2013/0294763 A1* | 11/2013 | Bruno | H04B 10/0775 398/16 |

FOREIGN PATENT DOCUMENTS

| | | | | |
|---|---|---|---|---|
| RU | 2146853 C1 | 3/2000 | | |
| WO | WO 2009/062237 A1 | 5/2009 | | |
| WO | WO-2011/030897 | * | 3/2011 | ......... H04B 10/0793 |

OTHER PUBLICATIONS

Yan et al., "Simultaneous Monitoring of Both Optical Signal-to-Noise Ratio and Polarization-Mode Dispersion Using Polarization Scrambling and Polarization Beam Splitting", Journal of Lightwave Technology, vol. 23, No. 10, Oct. 2005, p. 3290-3294.

* cited by examiner

150

```
┌─────────────────────────────────────────────────────────────┐
│ Acquire receiver parameters corresponding to a receiver     │
│ that receives the detected optical signal                   │ ~ S151
└─────────────────────────────────────────────────────────────┘
                              │
                              ▼
┌─────────────────────────────────────────────────────────────┐
│ Determine the OSNR of the detected optical signal according │
│ to the first alternating current component, the first       │
│ direct current component, the receiver parameters, and the  │ ~ S152
│ first correction information                                │
└─────────────────────────────────────────────────────────────┘
```

```
┌─────────────────────────────────────────────────────────────┐
│ Receive a second correction optical signal carrying ASE     │ ~ S171
│ noise                                                       │
└─────────────────────────────────────────────────────────────┘
                              │
                              ▼
┌─────────────────────────────────────────────────────────────┐
│ Detect a third alternating current component and a third    │
│ direct current component of the second correction optical   │ ~ S172
│ signal                                                      │
└─────────────────────────────────────────────────────────────┘
                              │
                              ▼
┌─────────────────────────────────────────────────────────────┐
│ Measure a reference OSNR of the second correction optical   │ ~ S173
│ signal                                                      │
└─────────────────────────────────────────────────────────────┘
                              │
                              ▼
┌─────────────────────────────────────────────────────────────┐
│ Acquire third modulation information of the second          │
│ correction optical signal and third correction information  │
│ corresponding to the third modulation information, where    │
│ an information type of the third modulation information is  │ ~ S174
│ the same as the information type of the first modulation    │
│ information                                                 │
└─────────────────────────────────────────────────────────────┘
                              │
                              ▼
┌─────────────────────────────────────────────────────────────┐
│ Determine the receiver parameters according to the third    │
│ alternating current component, the third direct current     │
│ component, the reference OSNR, and the third correction     │ ~ S175
│ information                                                 │
└─────────────────────────────────────────────────────────────┘
```

FIG. 6

METHOD, APPARATUS, NODE DEVICE AND NETWORK SYSTEM FOR DETECTING OPTICAL SIGNAL-TO-NOISE RATIO

CROSS-REFERENCE TO RELATED APPLICATIONS

This application is a continuation of International Application No. PCT/CN2012/072951, filed on Mar. 23, 2012, which is hereby incorporated by reference in its entirety.

TECHNICAL FIELD

The present invention relates to the communications field, and in particular, to method, apparatus, node device and network system for detecting optical signal-to-noise ratio in the communications field.

BACKGROUND

An optical signal-to-noise ratio (Optical Signal-to-Noise Ratio, "OSNR" for short) is one of key indicators for measuring optical signal performance in an optical wavelength division multiplexing (Wavelength Division Multiplexing, "WDM" for short) system. With wide deployment of coherent 40/100 Gbit/s wavelength division multiplexing systems, when a channel spacing is 50 GHz or smaller, optical spectrums of adjacent channels overlap, and in a WDM system including a reconfigurable optical add-drop multiplexer (Reconfigurable Optical Add-Drop Multiplexer, "ROADM" for short) during signal transmission, after amplified spontaneous emission (Amplified Spontaneous Emission, "ASE" for short) noise introduced by an erbium-doped optical fiber amplifier (Erbium-doped Optical Fiber Amplifier "EDFA" for short) is filtered by the ROADM, ASE noise levels inside and outside a channel become different. These factors cause a measured value acquired by using a traditional OSNR test method, that is, an out-of-band test method, to be no longer accurate, and an in-band method is required to detect the OSNR.

At present, one of in-band OSNR detection technologies is a polarization extinction (Polarization Nulling or Polarization Extinction) method. The method or its modified method separates an optical signal from noise by optical and algorithm means according to a basic characteristic that the optical signal to be detected is polarized while the noise is unpolarized. Because a coherent system uses a polarization state modulation mode, the optical signal and the noise cannot be distinguished according to a difference between polarization characteristics of the optical signal and the noise. Especially for a 100 G dual-polarized (or called polarization division multiplexing, Polarization Division Multiplexing) signal, the noise and the optical signal almost overlap and cannot be separated, and a measurement error is caused.

Another in-band OSNR detection method that can be applied to the coherent system is to split an input optical signal to be detected into two signals and send the two signals to a photodiode (PD) 1 and a PD2 respectively. One signal to be detected is processed by a low pass filter (Low Pass Filter, "LPF" for short) after being received by the PD1 and the other signal to be detected is processed by a band pass filter (Band Pass Filter, "BPF" for short) after being received by the PD2. These two signals, after being filtered, are sent to an analog to digital converter (Analog to Digital Converter, "ADC" for short) respectively for sampling. Sampled data is sent to a signal processing unit for processing and calculation, and the OSNR of the optical signal to be detected is acquired. A basic principle of the method is: Total signal energy of a phase shift keying (Phase Shift Keying, "PSK" for short) signal in two polarization states is highly concentrated in the vicinity of frequency 0 of a radio frequency (Radio Frequency, "RF" for short) spectrum after the phase shift keying signal is received by a photodiode, and beat frequency components of the signal and the noise may be extracted at a low frequency, and further, a ratio of a total signal size to the ASE noise, that is, the OSNR of the optical signal to be detected, may be calculated.

However, in the foregoing in-band OSNR detection methods, a residual amplitude modulation signal may be superimposed on a corresponding original phase modulation signal without an amplitude fluctuation at a transmitting end. Such amplitude modulation is reflected as the amplitude fluctuation on an RF power spectrum, and is generally called a residual amplitude modulation component (Residual Amplitude Modulation Component). In addition, this residual amplitude modulation component is different for optical signals to be detected that have different modulation formats and/or bit rates, and therefore OSNR detection precision is seriously affected.

SUMMARY

Embodiments of the present invention provide a method and an apparatus for detecting an optical signal-to-noise ratio, a node device, and a network system, which can improve OSNR detection precision.

According to one aspect, an embodiment of the present invention provides a method for detecting an optical signal-to-noise ratio. The method includes: receiving a detected optical signal carrying amplified spontaneous emission ASE noise; detecting a first alternating current component and a first direct current component of the detected optical signal; acquiring first modulation information of the detected optical signal; acquiring first correction information corresponding to the first modulation information according to the first modulation information; and determining an optical signal-to-noise ratio OSNR of the detected optical signal according to the first alternating current component, the first direct current component, and the first correction information.

According to another aspect, an embodiment of the present invention provides an apparatus for detecting an optical signal-to-noise ratio. The apparatus includes: a first receiving module, configured to receive a detected optical signal carrying amplified spontaneous emission ASE noise; a first detecting module, configured to detect a first alternating current component and a first direct current component of the detected optical signal; a first acquiring module, configured to acquire first modulation information of the detected optical signal; a second acquiring module, configured to acquire first correction information corresponding to the first modulation information according to the first modulation information; and a determining module, configured to determine an optical signal-to-noise ratio OSNR of the detected optical signal according to the first alternating current component, the first direct current component, and the first correction information.

According to still another aspect, an embodiment of the present invention provides a node device. The node device includes an optical splitter and the apparatus for detecting an optical signal-to-noise ratio according to the embodiment of the present invention, where:

the optical splitter is configured to separate a part from an optical signal received by the node device and input the part into the apparatus for detecting an optical signal-to-noise ratio; and the apparatus for detecting an optical signal-to-noise ratio is configured to detect an optical signal-to-noise ratio of the input optical signal, where the input optical signal carries amplified spontaneous emission noise.

According to still another aspect, an embodiment of the present invention provides a network system. The network system includes at least one first node device and at least one second node device that includes the apparatus for detecting an optical signal-to-noise ratio according to the embodiment of the present invention, where:

the apparatus for detecting an optical signal-to-noise ratio is configured to detect, on the second node device, an optical signal-to-noise ratio of an optical signal sent by the first node device, where the optical signal sent by the first node device carries amplified spontaneous emission noise when it reaches the second node device.

Based on the foregoing technical solutions, the method and the apparatus for detecting an optical signal-to-noise ratio, the node device, and the network system in the embodiments of the present invention can improve the OSNR detection precision by acquiring the first correction information corresponding to the first modulation information of the detected optical signal, and determining the OSNR of the detected optical signal according to the first correction information, thereby accurately measuring network performance.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5 is a schematic flowchart of a method for determining an optical signal-to-noise ratio according to an embodiment of the present invention;

FIG. 6 is a schematic flowchart of a method for acquiring receiver parameters according to an embodiment of the present invention;

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
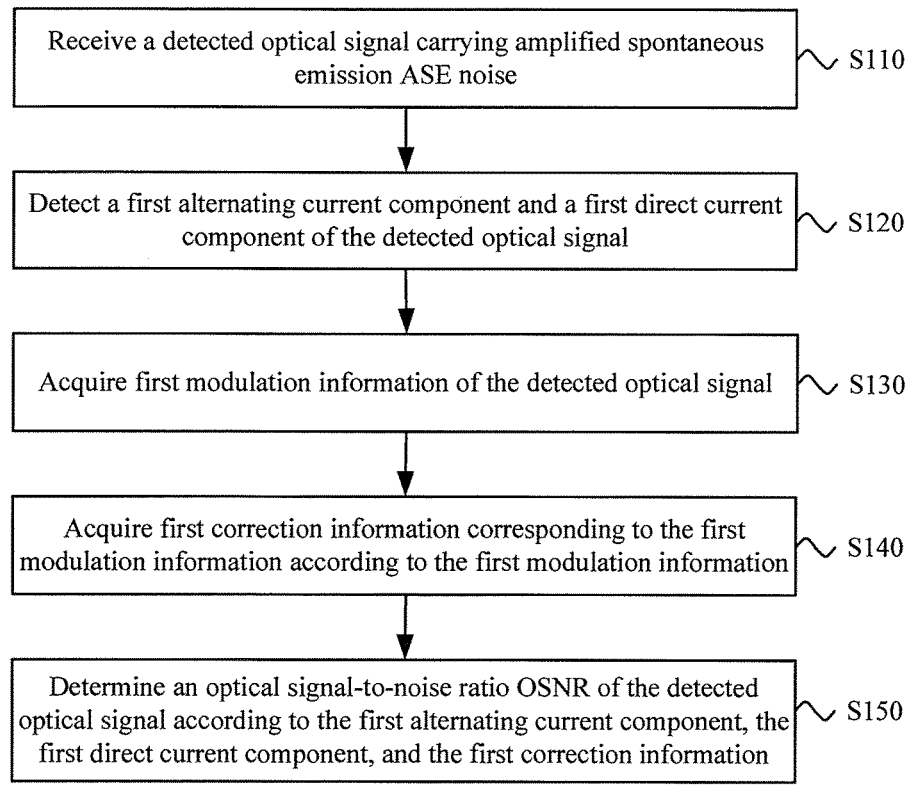
FIG. 1 is a schematic flowchart of a method for detecting an optical signal-to-noise ratio according to an embodiment of the present invention.

FIG. 1 is a schematic flowchart of a method 100 for detecting an optical signal-to-noise ratio according to an embodiment of the present invention. As shown in FIG. 1, the method 100 includes:

S110. Receive a detected optical signal carrying amplified spontaneous emission ASE noise.

S120. Detect a first alternating current component and a first direct current component of the detected optical signal.

S130. Acquire first modulation information of the detected optical signal.

S140. Acquire first correction information corresponding to the first modulation information according to the first modulation information.

S150. Determine an OSNR of the detected optical signal according to the first alternating current component, the first direct current component, and the first correction information.

An apparatus for detecting an optical signal-to-noise ratio may detect, according to the detected optical signal received, the first alternating current component and the first direct current component of the detected optical signal, where the detected optical signal carries amplified spontaneous emission ASE noise. The apparatus may acquire the first correction information corresponding to the first modulation information according to the acquired first modulation information of the detected optical signal, so that the apparatus for detecting an optical signal-to-noise ratio may determine the OSNR of the detected optical signal according to the first alternating current component, the first direct current component, and the first correction information.

Therefore, the method for detecting an optical signal-to-noise ratio in the embodiment of the present invention can improve OSNR detection precision by acquiring the first correction information corresponding to the first modulation information of the detected optical signal and determining the OSNR of the detected optical signal according to the first correction information, thereby accurately measuring network performance.

It should be understood that a term "and/or" in the embodiment of the present invention is merely used to describe an association relationship of associated objects, and indicates that three relationships may exist, for example, A and/or B may indicate the following three cases: A exists separately, both A and B exist, and B exists separately. In addition, in the embodiment of the present invention, the symbol "/" generally indicates that the associated objects before and after the symbol are in an "or" relationship.

It should also be understood that the technical solutions in the embodiment of the present invention may be applied to various optical communications systems, for example, a plesiochronous digital hierarchy (Plesiochronous Digital Hierarchy, "PDH" for short) optical communications system, a synchronous digital hierarchy (Synchronous Digital Hierarchy, "SDH" for short) optical communications system, a dense wavelength division multiplexing (Dense Wavelength Division Multiplexing, "DWDM" for short) optical communications system, an all-optical network optical communications system, and the like. For the purpose of clear and brief description, the embodiment of the present invention uses a WDM optical communications system as an example, but the embodiment of the present invention is not limited thereto.

It should also be understood that detection may also be understood as monitoring (Monitoring), measurement, and the like in the embodiment of the present invention, and that the embodiment of the present invention is not limited thereto.

In S110, the apparatus for detecting an optical signal-to-noise ratio receives the detected optical signal carrying amplified spontaneous emission ASE noise.

For example, the apparatus for detecting an optical signal-to-noise ratio may receive, through its monitoring port, the detected optical signal carrying ASE noise. It should be understood that an optical signal received by the monitoring port of the apparatus for detecting an optical signal-to-noise ratio may be a single-wavelength optical signal (that is, the detected optical signal) or may be a multi-wavelength optical signal, where the multi-wavelength optical signal includes the detected optical signal. When the apparatus for detecting an optical signal-to-noise ratio receives the multi-wavelength optical signal including the detected optical signal, an optical filter may be used to filter signals of other wavelengths or noise than the detected optical signal, so as to acquire the detected optical signal. In the embodiment of the present invention, the optical filter may be a tunable optical filter (Tunable Optical Filter, "TOF" for short). A center wavelength of the TOF may be set as a wavelength of the detected optical signal to filter other signals or noise than the detected optical signal. It should be understood that a bandwidth of the TOF should be less than a signal bandwidth. For example, for a 40 GHz signal bandwidth, the bandwidth of the TOF may be generally set to 20 to 25 GHz.

In S120, the apparatus for detecting an optical signal-to-noise ratio detects the first alternating current component and the first direct current component of the detected optical signal.

In the embodiment of the present invention, the apparatus for detecting an optical signal-to-noise ratio converts the detected optical signal into an electric signal through a photoelectric detector of its built-in optical receiver and then acquires the first alternating current component and the first direct current component of the detected optical signal based on the electric signal. The photoelectric detector, for example, may be a photodiode (Photodiode, "PD" for short), a phototriode, an avalanche photodiode, or the like.

In the embodiment of the present invention, the electric signal output by the photoelectric detector may be split into two electric signals. One electric signal is sent to a low pass filter LPF for signal processing to acquire the first direct current component of the detected optical signal. The other electric signal is sent to a band pass filter BPF for signal processing to acquire the first alternating current component of the detected optical signal.

In another embodiment of the present invention, a detected optical signal may be split into two detected optical signals. One detected optical signal may be converted into an electric signal through a photoelectric detector and then the electric signal is filtered by an LPF. A first direct current component of the detected optical signal may be acquired after signal processing is performed on the electric signal output by the LPF. The other detected optical signal may be converted into an electric signal through the photoelectric detector and then the electric signal is filtered by a BPF. A first alternating current component of the detected optical signal may be acquired after signal processing is performed on the signal output by the BPF.

Definitely, the embodiment of the present invention may also use any other optical and/or electric processing method to detect the first alternating current component and the first direct current component of the detected optical signal, and the embodiment of the present invention is not limited thereto. It should be understood that the optical receiver in the embodiment of the present invention may include the photoelectric detector, an amplification circuit, an analog to digital converter, a digital signal processor (Digital Signal Processor, "DSP" for short), and the like, or may further include an electric filter, such as the LPF and the BPF, or may further include the foregoing optical filter such as the TOF. It should be noted that the electric filter is not mandatory in the embodiment of the present invention, for example, the electric filter is not required when functions of the LPF and the BPF can be implemented in the DSP; the optical filter is not mandatory either, for example, the apparatus for detecting an optical signal-to-noise ratio in the embodiment of the present invention does not require the optical filter when the detected optical signal received by the apparatus for detecting an optical signal-to-noise ratio in the embodiment of the present invention is already a single-wavelength signal.

In the embodiment of the present invention, for the purpose of clear and brief description, a person of ordinary skill in the art may understand that an alternating current component of the optical signal refers to an alternating current component of an electric signal acquired through optical-to-electrical conversion and that a direct current component of the optical signal refers to a direct current component of the electric signal acquired through optical-to-electrical conversion.

In S130, the apparatus for detecting an optical signal-to-noise ratio acquires the first modulation information of the detected optical signal.

In the embodiment of the present invention, optionally, the first modulation information may include at least one of the following information types: a modulation format, a bit rate, start and end positions of a spectrum of an optical signal, and a spectrum bandwidth occupied by the optical signal.

Optionally, the modulation format includes one or more of the following code types: a binary phase shift keying (Binary Phase Shift Keying, "BPSK" for short) code type, a quadrature phase shift keying (Quadrature Phase Shift Keying, "QPSK" for short) code type, a differential phase shift keying (Differential Phase Shift Keying, "DPSK" for short) code type, and a differential quadrature phase shift keying (Differential Quadrature Phase Shift Keying, "DQPSK" for short) code type. It should be understood that the modulation format may also include any other modulation format. Optionally, the foregoing modulation format may be a non-return-to-zero (Non-Return-to-Zero, "NRZ" for short) modulation format or may be a carrier suppressed return-to-zero (Carrier Suppressed Return-to-Zero, "CSRZ" for short) modulation format, and the embodiment of the present invention is not limited thereto.

For example, the first modulation information may include at least one of the following: the modulation format of the detected optical signal, the bit rate of the detected optical signal, the start and end positions of the spectrum of the detected optical signal, and the spectrum bandwidth occupied by the detected optical signal. It should be understood that, in the embodiment of the present invention, "an information type of modulation information of a signal A includes B" means that the modulation information of the signal A includes information indicating that the information type of the signal A is B, where the information type refers to the foregoing modulation format, bit rate, start and end positions of the spectrum of the optical signal, or the spectrum bandwidth occupied by the optical signal, or the like. For example, if the bit rate of the detected optical signal is 10 Gbit/s and the BPSK code type is used as a modulation code type, a type of the information "10 Gbit/s" is the bit rate and a type of the information "BPSK code type" is the modulation format. The information included in the first modulation information is specifically "BPSK code type" and "10 Gbit/s". The information types of "BPSK code type" and "10 Gbit/s" are the modulation format and the bit rate respectively. The embodiment of the present invention uses this as an example for description, but the present invention is not limited thereto.

It should be understood that, in the embodiment of the present invention, terms "first", "second", and "third" are merely used to distinguish different content and should not impose any limitation to the embodiment of the present invention. In the embodiment of the present invention, different "modulation information" includes at least one of the following information types: the modulation format, the bit rate, the start and end positions of the spectrum of the optical signal, and the spectrum bandwidth occupied by the optical signal, and the information types of different modulation information are the same. For example, if the first modulation information includes two pieces of modulation information: the modulation format and the bit rate, second modulation information and third modulation information also include the two pieces of modulation information: the modulation format and the bit rate. Using "first", "second", and "third" to limit the "modulation information" is merely for convenient description in distinguishing modulation information of different signals. For example, in the embodiment of the present invention, "the first modulation information" refers to the modulation information of the detected optical signal carrying ASE noise; "the second modulation information" mentioned in the following refers to modulation information of a first correction optical signal not carrying ASE noise; "the third modulation information" mentioned in the following refers to modulation information of a second correction optical signal carrying ASE noise.

It should be understood that, in the embodiment of the present invention, modulation means processing information of a signal source and loading the processed information to a carrier to ensure that the information is in a form suitable for channel transmission. During modulation, a manner of bearing information includes: a polarization direction, an amplitude, a frequency, a phase, and the like. These factors or their combination is generally called the modulation format. The embodiment of the present invention uses only the modulation format including the code type as an example for description, but the embodiment of the present invention is not limited thereto.

It should also be understood that, in the embodiment of the present invention, the bit rate generally refers to the number of bits (bits) transmitted within unit time (second) in a communications system, for example, the bit rate is 43 Gbits per second (bit/s).

In the embodiment of the present invention, the apparatus for detecting an optical signal-to-noise ratio may acquire the first modulation information of the detected optical signal according to the detected optical signal, or may acquire the first modulation information according to a control signal in the form of an electric signal. The following respectively describes the foregoing two cases with reference to FIG. 2. Definitely, the apparatus for detecting an optical signal-to-noise ratio may also acquire the first modulation information of the detected optical signal by using other methods, and the embodiment of the present invention is not limited thereto.

Optionally, a method for acquiring the first modulation information according to the embodiment of the present invention may specifically include:

acquiring the first modulation information according to a high-frequency pilot signal carried in the detected optical signal.

A wavelength tracker (Wavelength Tracker, "WT" for short) technology may be used to implement transmission of the first modulation information carried in the detected optical signal. Specifically, small-amplitude modulation may be first performed on the output detected optical signal at a transmitting end, for example, a modulation depth is less than 3%, and a frequency of a modulation signal is higher than a radio frequency (Radio Frequency, "RF" for short) band required to detect the OSNR, for example, the frequency of the modulation signal is greater than 10 MHz. The modulation signal is also called a pilot signal, that is, a pilot or a pilot combination is used to indicate corresponding modulation information when the transmitting end sends a signal. By detecting the detected optical signal, the apparatus for detecting an optical signal-to-noise ratio may detect the pilot signal modulated at the transmitting end and identify the modulation information indicated by the pilot signal.

Because the pilot signal carried by the detected optical signal uses a high modulation frequency, no interference is caused to a low RF band required to detect the OSNR and interference of stimulated Raman scattering (Stimulated Raman Scattering, "SRS" for short) to a signal link and low-frequency power can be mitigated, thereby further improving the OSNR detection precision.

Figure 2:
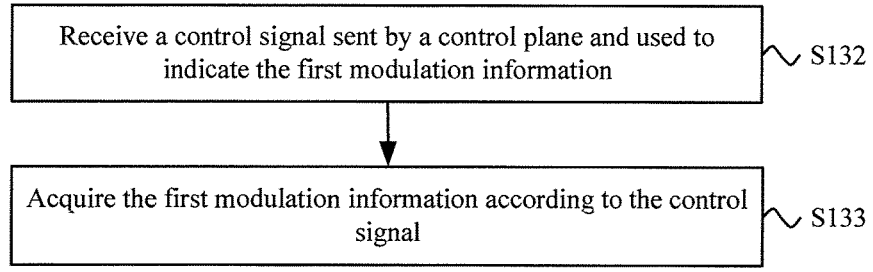
FIG. 2 is a schematic flowchart of a method for acquiring first modulation information according to an embodiment of the present invention.

In another aspect, in an embodiment of the present invention, as shown in FIG. 2, a method 130 for acquiring the first modulation information may further include:

S132. Receive a control signal sent by a control plane and used to indicate the first modulation information.

S133. Acquire the first modulation information according to the control signal.

That is to say, in the embodiment of the present invention, for example, the control plane may transmit, through a control signal in the form of an electric signal, the first modulation information of the detected optical signal to the apparatus for detecting an optical signal-to-noise ratio. Specifically, for example, the control plane may use one or more types of modulation information including a modulation format, a bit rate, start and end positions of a spectrum of an optical signal, and a spectrum bandwidth occupied by the optical signal at the transmitting end as the first modulation information, use a certain encoding mode, and send, through the control signal, the first modulation information to the apparatus for detecting an optical signal-to-noise ratio. Therefore, the apparatus for detecting an optical signal-to-noise ratio receives the control signal sent by the control plane and acquires the first modulation information according to the control signal.

In the foregoing embodiment, the apparatus for detecting an optical signal-to-noise ratio acquires the first modulation information of the detected optical signal according to the control signal, which does not cause interference to OSNR detection either.

In S140, the apparatus for detecting an optical signal-to-noise ratio acquires the first correction information corresponding to the first modulation information according to the first modulation information.

In the embodiment of the present invention, the apparatus for detecting an optical signal-to-noise ratio may acquire the first correction information by receiving a correction optical signal not carrying ASE noise, where the correction optical signal has the same first modulation information as the detected optical signal, and by detecting an alternating current component and a direct current component of the correction optical signal; the apparatus for detecting an optical signal-to-noise ratio may also acquire the first correction information by querying a predefined correspondence table. The following describes the foregoing embodiment with reference to FIG. 3 and FIG. 4.

Figure 3:
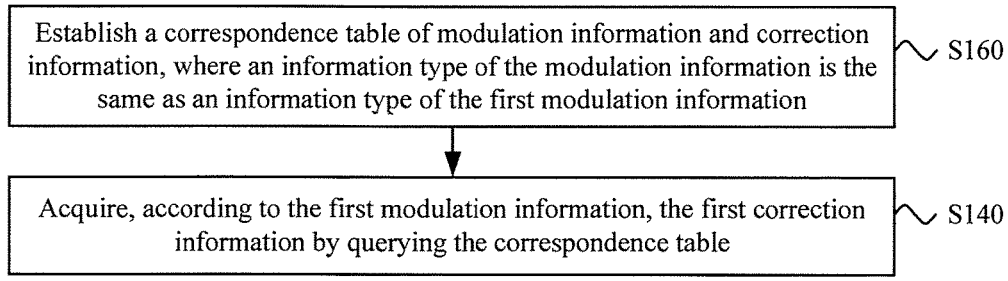
FIG. 3 is another schematic flowchart of a method for detecting an optical signal-to-noise ratio according to an embodiment of the present invention.

As shown in FIG. 3, the method 100 for detecting an optical signal-to-noise ratio according to the embodiment of the present invention optionally further includes:

S160. Establish a correspondence table of modulation information and correction information, where an information type of the modulation information is the same as an information type of the first modulation information.

The acquiring first correction information corresponding to the first modulation information includes: acquiring, according to the first modulation information, the first correction information by querying the correspondence table.

Because the apparatus for detecting an optical signal-to-noise ratio may directly acquire the correction information by means of query, the method in the embodiment of the present invention can improve not only the OSNR detection precision but also OSNR detection efficiency.

Figure 4:
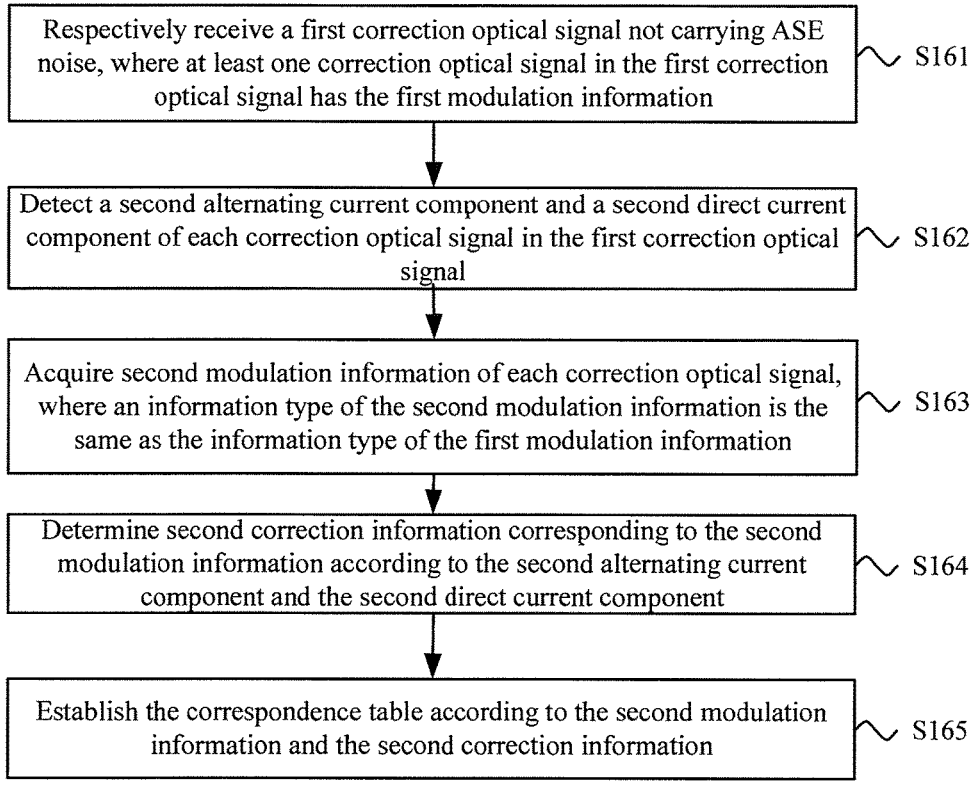
FIG. 4 is a schematic flowchart of a method for establishing a correspondence table according to an embodiment of the present invention.

In an embodiment of the present invention, as shown in FIG. 4, a method 160 for establishing the correspondence table includes:

S161. Respectively receive a first correction optical signal not carrying ASE noise, where at least one correction optical signal in the first correction optical signal has the first modulation information.

S162. Detect a second alternating current component and a second direct current component of each correction optical signal in the first correction optical signal.

S163. Acquire second modulation information of each correction optical signal, where an information type of the second modulation information is the same as the information type of the first modulation information.

S164. Determine second correction information corresponding to the second modulation information according to the second alternating current component and the second direct current component.

S165. Establish the correspondence table according to the second modulation information and the second correction information.

In S161, the first correction optical signal includes one or more correction optical signals not carrying ASE noise and the at least one correction optical signal in the first correction optical signal has the same modulation information as the detected optical signal.

In S162, the apparatus for detecting an optical signal-to-noise ratio detects the alternating current component and the direct current component of each received correction optical signal. For example, the apparatus for detecting an optical signal-to-noise ratio selects a certain alternating current component range such as 0 to 10 MHz and collects the alternating current component and the direct current component at least twice under a high OSNR (for example, an OSNR of the correction optical signal is greater than 30 dB).

In S163, the apparatus for detecting an optical signal-to-noise ratio may acquire the second modulation information of each correction optical signal through a high-frequency pilot signal carried in each correction optical signal; or may acquire the second modulation information of each correction optical signal by receiving the control signal sent by the control plane.

In S164, the apparatus for detecting an optical signal-to-noise ratio determines the second correction information corresponding to the second modulation information according to the second alternating current component and the second direct current component. By formula derivation, the following uses the modulation information whose information type includes two pieces of information: a modulation format and a bit rate as an example to describe in detail how to acquire the correction information.

It is assumed that an optical signal $E_{sig}(t)$ sent by a transmitting end in a dual-polarization modulation system may be expressed by the following equation (1) in a time domain, where the optical signal $E_{sig}(t)$ has a specific modulation format (for example, a code type) and bit rate:

$$E_{sig}(t)=[E_{sx}(t)+E_{RAMCX}(t)]\hat{x}+[E_{sy}(t)+E_{RAMCY}(t)]\hat{y} \quad (1)$$

where $\hat{x}$ and $\hat{y}$ are unit vectors in two mutually orthogonal polarization directions respectively; $E_{sx}(t)$ and $E_{sy}(t)$ indicate signal strength in the two mutually orthogonal polarization directions respectively; and $E_{RAMCX}(t)$ and $E_{RAMCY}(t)$ indicate a residual amplitude modulation component. ASE noise $E_n(t)$ introduced during transmission may be expressed by the following equation (2):

$$E_n(t)=E_{nx}(t)\cdot\hat{x}+E_{ny}(t)\cdot\hat{y} \quad (2)$$

where $E_{nx}(t)$ and $E_{ny}(t)$ indicate noise of two polarization states respectively.

Therefore, total electric field intensity $E_s(t)$ of a signal and the noise may be expressed by the following equation (3):

$$E_s(t)=[E_{sx}(t)+E_{RAMCX}(t)+E_{nx}(t)]\hat{x}+[E_{sy}(t)+E_{RAMCY}(t)+E_{ny}(t)]\hat{y} \quad (3)$$

At a receiving end, an optical current I(t) after the optical signal passes through a photoelectric detector may be expressed by the following equation (4):

$$I(t) = E_s(t) \times E_s(t)^* \quad (4)$$

$$= \{[E_{sx}(t) + E_{nx}(t)]\hat{x} + [E_{sy} + E_{ny}]\hat{y}\} \times$$

$$\{[E_{sx}^*(t) + E_{nx}^*(t)]\hat{x} + [E_{sy}^*(t) + E_{ny}^*(t)]\hat{y}\}$$

$$= [E_{sx}(t) + E_{nx}(t)][E_{sx}^*(t) + E_{nx}^*(t)] \cdot \hat{x} \cdot \hat{x} +$$

$$[E_{sy}(t) + E_{ny}(t)][E_{sy}^*(t) + E_{ny}^*(t)] \cdot \hat{y} \cdot \hat{y}$$

$$= P_{sx} + P_{sy} + P_{nx} + P_{ny} + 2Re\{E_{sx}(t)E_{nx}^*(t)\} +$$

$$2Re\{E_{sy}(t)E_{ny}^*(t)\}$$

$$= P_s + P_n + 2Re\{E_{sx}(t)E_{nx}^*(t)\} +$$

$$2Re\{E_{sy}(t)E_{ny}^*(t)\}$$

where $P_{sx}=E_{sx}(t)E^*_{sx}(t)$; $P_{sy}=E_{sy}(t)E^*_{sy}(t)$; $P_{nx}=E_{nx}(t)E^*_{nx}(t)$; $P_{ny}=E_{ny}(t)E^*_{ny}(t)$; $P_s=P_{sx}+P_{sy}$; $P_n=P_{nx}+P_{ny}$; $P_s$ indicates signal power in the detected optical signal and is specifically equal to the sum of signal power in the two mutually orthogonal polarization directions, that is, $P_{sx}$ and $P_{sy}$; and $P_n$ indicates the sum of ASE noise power in the two mutually orthogonal polarization directions, that is, $P_{nx}$ and $P_{ny}$.

An alternating current component of an electric signal received by the receiving end may be expressed by alternating current power $S(\Omega)$. $S(\Omega)$ may be determined through the optical current $I(t)$. Specifically, the alternating current power $S(\Omega)$ may be expressed by the following equation (5):

$$S(\Omega) = E\left[\left|\int I(t) \cdot \exp(i\Omega t)dt\right|^2\right] \quad (5)$$

$$= \int\int E[I(t) \cdot I(\tau)] \cdot \exp[i\Omega(t-\tau)]dt d\tau$$

$$= \frac{\alpha_1}{B_0}(2P_sP_n + P_n^2) + \beta \cdot P_s^2 + \gamma$$

$$= A \cdot S_1 + B \cdot S_2 + S_3$$

where $S_1$ indicates beat frequency components of the signal and the ASE noise, and $S_1=P_sP_n$; $S_2$ indicates a self-beat component of the ASE noise, and $S_2=P_n^2$; $S_3$ indicates other components, and $S_3=\beta\cdot P_s^2+\gamma$; A, B, $\alpha_1$, $\beta$, $\gamma$, and $B_0$ are all constants, and specifically, $A=2\alpha_1/B_0$ and $B=\alpha_1/B_0$; $\alpha_1$ is a receiver parameter of an alternating current branch of a receiver, the parameter may be a ratio of a set OSNR value to a difference acquired by subtracting $\beta\cdot P_s^2+\gamma$ from a measured alternating current component $S(\Omega)$ and the parameter reflects an impact of amplification times of an amplifier in the alternating current branch and a TOF on OSNR detection; $\beta$ indicates a ratio of a residual amplitude modulation component in the signal; $\gamma$ indicates a size of other noise such as thermal noise, shot noise, and circuit noise; $B_0$ indicates a noise equivalent bandwidth of the detected optical signal; and $\Omega$ indicates a frequency of a time domain signal after Fourier transform.

A direct current component of the electric signal received by the receiving end may be expressed by a mathematical expectation $E[I(t)]$ of the optical current $I(t)$. Specifically, the direct current component $E[I(t)]$ may be expressed by the following equation (6):

$$E[I(t)] = \alpha_2 \cdot (P_s + P_n) = \alpha_2 \cdot P_s\left(1 + \frac{1}{OSNR} \cdot \frac{B_0}{R}\right) \quad (6)$$

where OSNR=$(P_s \times B_0)/(P_n \times R)$; $\alpha_2$ indicates a receiver parameter of a direct current branch of the receiver, and the receiver parameter reflects an impact of amplification times of an amplifier in the direct current branch and the TOF on OSNR detection; R is a constant, and R is a reference bandwidth for noise measurement in an OSNR definition and is generally a fixed value, 0.1 nm.

When the received optical signal does not carry ASE noise, that is, the OSNR of the correction optical signal is high, for example, the OSNR is greater than 30 dB, the foregoing equations (5) and (6) may be simplified into the following equations (7) and (8) respectively:

$$S(\Omega)=\beta\cdot P_s^2+\gamma \quad (7) \text{ and}$$

$$E[I(t)]=\alpha_2\cdot P_s \quad (8)$$

Therefore, in S164, the apparatus for detecting an optical signal-to-noise ratio determines, according to the foregoing equations (7) and (8), parameters $\beta$ and $\gamma$ corresponding to the second modulation information according to at least two second alternating current components $S(\Omega)$ and at least two second direct current components $E[I(t)]$ acquired through detection. It should be understood that, in the embodiment of the present invention, the correction information may be the parameters $\beta$ and $\gamma$, or may be other information related to the parameters $\beta$ and $\gamma$, for example, the correction information may also be $\beta\cdot P_s^2+\gamma$. The embodiment of the present invention uses the correction information that includes the parameters $\beta$ and $\gamma$ as an example for description, but the embodiment of the present invention is not limited thereto.

In S165, the apparatus for detecting an optical signal-to-noise ratio establishes the correspondence table of the modulation information and the correction information according to second modulation information of signals from different transmitting ends and corresponding second correction information. Therefore, the apparatus for detecting an optical signal-to-noise ratio may acquire the first correction information corresponding to the first modulation information of the detected optical signal by querying the correspondence table.

In S150, based on the foregoing equations (5) and (6), the apparatus for detecting an optical signal-to-noise ratio may determine the OSNR of the detected optical signal according to the first alternating current component, the first direct current component, and the first correction information, where the parameters $\alpha_1$, $\alpha_2$, $B_0$, and R are all constants and may be preset and fixed in the foregoing formulas.

Therefore, the method for detecting an optical signal-to-noise ratio in the embodiment of the present invention can improve the OSNR detection precision by acquiring the first correction information corresponding to the first modulation information of the detected optical signal and determining the OSNR of the detected optical signal according to the first correction information, thereby accurately measuring network performance.

In the embodiment of the present invention, the receiver parameters $\alpha_1$ and $\alpha_2$ may be preset or may be determined according to the correction optical signal. When the receiver parameters $\alpha_1$ and $\alpha_2$ are determined according to the correction optical signal, as shown in FIG. 5, step S150 in the method for detecting an optical signal-to-noise ratio in the embodiment of the present invention specifically includes:

S151. Acquire receiver parameters corresponding to a receiver that receives the detected optical signal.

S152. Determine the OSNR of the detected optical signal according to the first alternating current component, the first direct current component, the receiver parameters, and the first correction information.

Optionally, the determining the OSNR of the detected optical signal includes:

based on the first alternating current component, the first direct current component, the first correction information, and the receiver parameters, determining the OSNR of the detected optical signal according to the following equations (9) and (10):

$$S = \frac{2\alpha_1 P_s^2}{R}\left(\frac{1}{OSNR} + \frac{B_0}{2R \cdot OSNR^2}\right) + \beta \cdot P_s^2 + \gamma \text{ and} \quad (9)$$

$$E = \alpha_2 \cdot P_s\left(1 + \frac{1}{OSNR} \cdot \frac{B_0}{R}\right) \quad (10)$$

where R and $B_0$ are constants; S indicates the first alternating current component; E indicates the first direct current component; $\beta$ and $\gamma$ indicate the first correction information corresponding to the first modulation information; and $\alpha_1$ and $\alpha_2$ indicate the receiver parameters.

In an embodiment of the present invention, as shown in FIG. 6, a method 151 for acquiring the receiver parameters may include:

S171. Receive a second correction optical signal carrying ASE noise.

S172. Detect a third alternating current component and a third direct current component of the second correction optical signal.

S173. Measure an OSNR reference value of the second correction optical signal.

S174. Acquire third modulation information of the second correction optical signal and third correction information corresponding to the third modulation information, where an information type of the third modulation information is the same as the information type of the first modulation information.

S175. Determine the receiver parameters according to the third alternating current component, the third direct current component, the OSNR reference value, and the third correction information.

In S171, the second correction optical signal is used to determine the receiver parameters. A wavelength of the second correction optical signal may be the same as or may be different from a wavelength of the first correction optical signal, and the second correction optical signal may have the same modulation information as the detected optical signal or may have other modulation information. The embodiment of the present invention is not limited thereto.

In S172, similarly, a third alternating current component and a third direct current component of an electric signal at the receiving end may also be determined according to an optical current acquired after the second correction optical signal passes through a photoelectric detector.

In S173, for example, an OSNR of the second correction optical signal, which is measured by using a spectrometer, is used as the OSNR reference value. Definitely, the OSNR reference value of the second correction optical signal may also be measured by using other methods, and the embodiment of the present invention is not limited thereto.

In S174, the apparatus for detecting an optical signal-to-noise ratio may acquire the third correction information by querying the correspondence table of the modulation information and the correction information; or the apparatus for detecting an optical signal-to-noise ratio may calculate the third correction information corresponding to the third modulation information according to a parameter such as an alternating current component and a direct current component with reference to the method 160 shown in FIG. 4, and the embodiment of the present invention is not limited thereto.

In S175, the apparatus for detecting an optical signal-to-noise ratio may determine the receiver parameters according to the third alternating current component, the third direct current component, the OSNR reference value, and the third correction information, for example, according to the foregoing equations (5) and (6).

It should be understood that, in the embodiments of the present invention, sequence numbers of the foregoing processes do not mean an execution sequence, and that the execution sequence of each process should be determined according to a function and an internal logic of the process and should not impose any limitation to an implementation process of each embodiment of the present invention.

Therefore, the method for detecting an optical signal-to-noise ratio in the embodiment of the present invention can improve the OSNR detection precision by acquiring the first correction information corresponding to the first modulation information of the detected optical signal and determining the OSNR of the detected optical signal according to the first correction information, thereby accurately measuring network performance.

The method for detecting an optical signal-to-noise ratio according to the embodiment of the present invention has been described in detail with reference to FIG. 1 to FIG. 6. The following describes an apparatus for detecting an optical signal-to-noise ratio, a node device, and a network system according to embodiments of the present invention with reference to FIG. 7 to FIG. 14.

Figure 7:
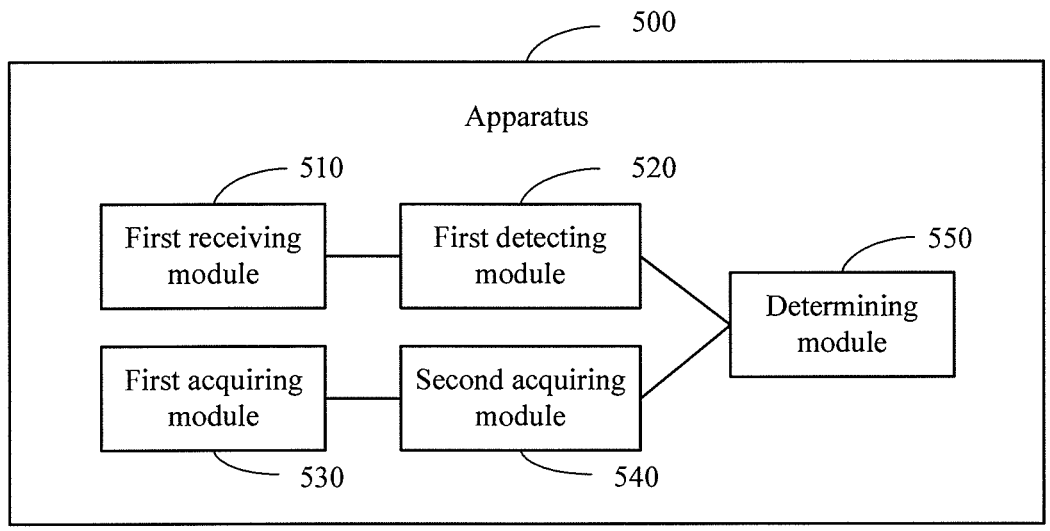
FIG. 7 is a schematic block diagram of an apparatus for detecting an optical signal-to-noise ratio according to an embodiment of the present invention.

FIG. 7 is a schematic block diagram of an apparatus 500 for detecting an optical signal-to-noise ratio according to an embodiment of the present invention. As shown in FIG. 7, the apparatus 500 includes:

a first receiving module 510, configured to receive a detected optical signal carrying amplified spontaneous emission ASE noise;

a first detecting module 520, configured to detect a first alternating current component and a first direct current component of the detected optical signal;

a first acquiring module 530, configured to acquire first modulation information of the detected optical signal;

a second acquiring module 540, configured to acquire first correction information corresponding to the first modulation information according to the first modulation information; and a determining module 550, configured to determine an OSNR of the detected optical signal according to the first alternating current component, the first direct current component, and the first correction information.

The apparatus for detecting an optical signal-to-noise ratio in the embodiment of the present invention acquires the first correction information corresponding to the first modulation information of the detected optical signal and determines the OSNR of the detected optical signal according to the first correction information. Therefore, the apparatus for detecting an optical signal-to-noise ratio that is provided in the embodiment of the present invention has high OSNR detection precision and lays a solid basis for accurately measuring network performance.

Optionally, a modulation format in the embodiment of the present invention includes at least one of the following code types: a binary phase shift keying BPSK code type, a quadrature phase shift keying QPSK code type, a differential phase shift keying DPSK code type, and a differential quadrature phase shift keying DQPSK code type. Furthermore, the modulation format, for example, may be a non-return-to-zero NRZ modulation format, or a carrier suppressed return-to-zero CSRZ modulation format, or the like.

Figure 8:
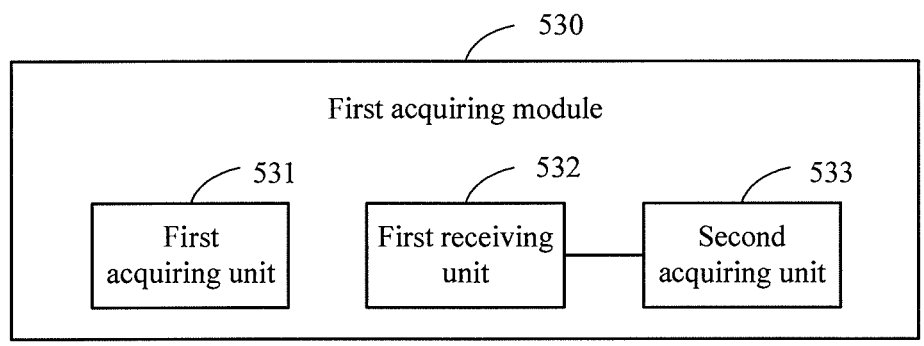
FIG. 8 is a schematic block diagram of a first acquiring module according to an embodiment of the present invention.

In an embodiment of the present invention, as shown in FIG. 8, optionally, the first acquiring module 530 includes:

a first acquiring unit 531, configured to acquire the first modulation information according to a high-frequency pilot signal carried in the detected optical signal.

In an embodiment of the present invention, as shown in FIG. 8, optionally, the first acquiring module 530 includes:

a first receiving unit 532, configured to receive a control signal sent by a control plane and used to indicate the first modulation information; and a second acquiring unit 533, configured to acquire the first modulation information according to the control signal.

In the embodiment of the present invention, optionally, the first modulation information may include at least one of the following information types: a modulation format, a bit rate, start and end positions of a spectrum of an optical signal, and a spectrum bandwidth occupied by the optical signal.

Figure 9:
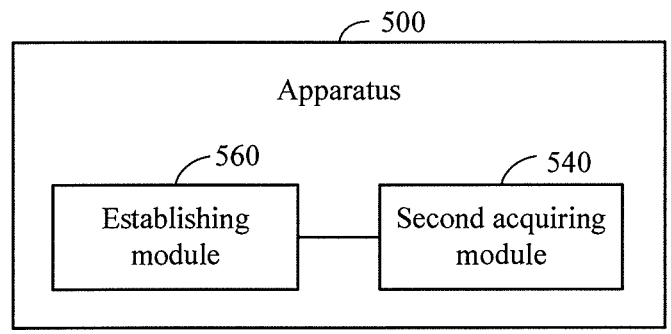
FIG. 9 is another schematic block diagram of an apparatus for detecting an optical signal-to-noise ratio according to an embodiment of the present invention.

In an embodiment of the present invention, as shown in FIG. 9, optionally, the apparatus 500 further includes:

an establishing module 560, configured to establish a correspondence table of modulation information and correction information, where an information type of the modulation information is the same as an information type of the first modulation information; where the second acquiring module 540 is further configured to acquire, according to the first modulation information, the first correction information by querying the correspondence table.

Figure 10:
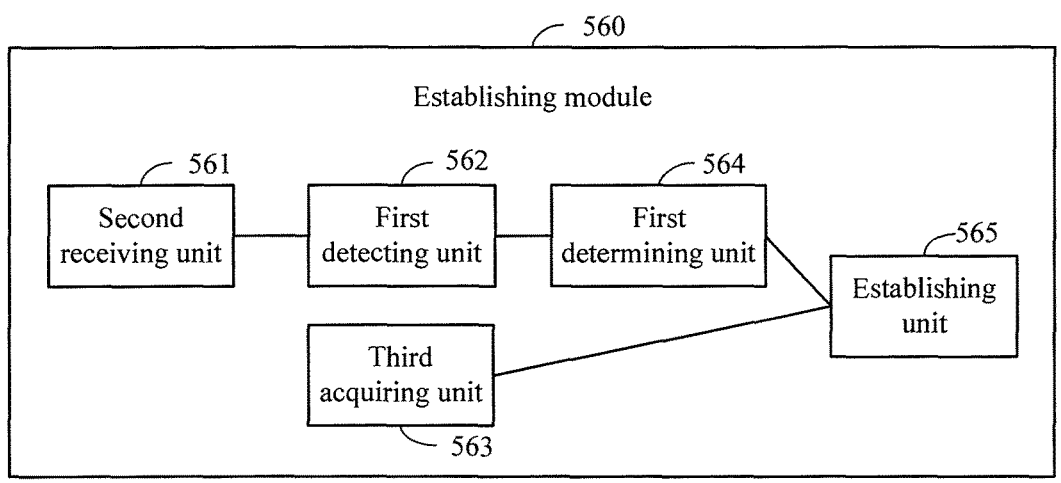
FIG. 10 is a schematic block diagram of an establishing module according to an embodiment of the present invention.

In an embodiment of the present invention, as shown in FIG. 10, optionally, the establishing module 560 includes:

a second receiving unit 561, configured to respectively receive a first correction optical signal not carrying ASE noise, where at least one correction optical signal in the first correction optical signal has the first modulation information;

a first detecting unit 562, configured to detect a second alternating current component and a second direct current component of each correction optical signal in the first correction optical signal;

a third acquiring unit 563, configured to acquire second modulation information of each correction optical signal, where an information type of the second modulation information is the same as the information type of the first modulation information;

a first determining unit 564, configured to determine second correction information corresponding to the second modulation information according to the second alternating current component and the second direct current component; and an establishing unit 565, configured to establish the correspondence table according to the second modulation information and the second correction information.

Figure 11:
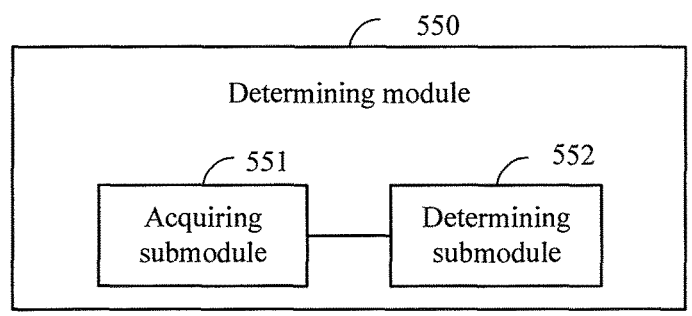
FIG. 11 is a schematic block diagram of a determining module according to an embodiment of the present invention.

In an embodiment of the present invention, as shown in FIG. 11, optionally, the determining module 550 includes:

an acquiring submodule 551, configured to acquire receiver parameters corresponding to a receiver that receives the detected optical signal; and a determining submodule 552, configured to determine the OSNR of the detected optical signal according to the first alternating current component, the first direct current component, the receiver parameters, and the first correction information.

Figure 12:
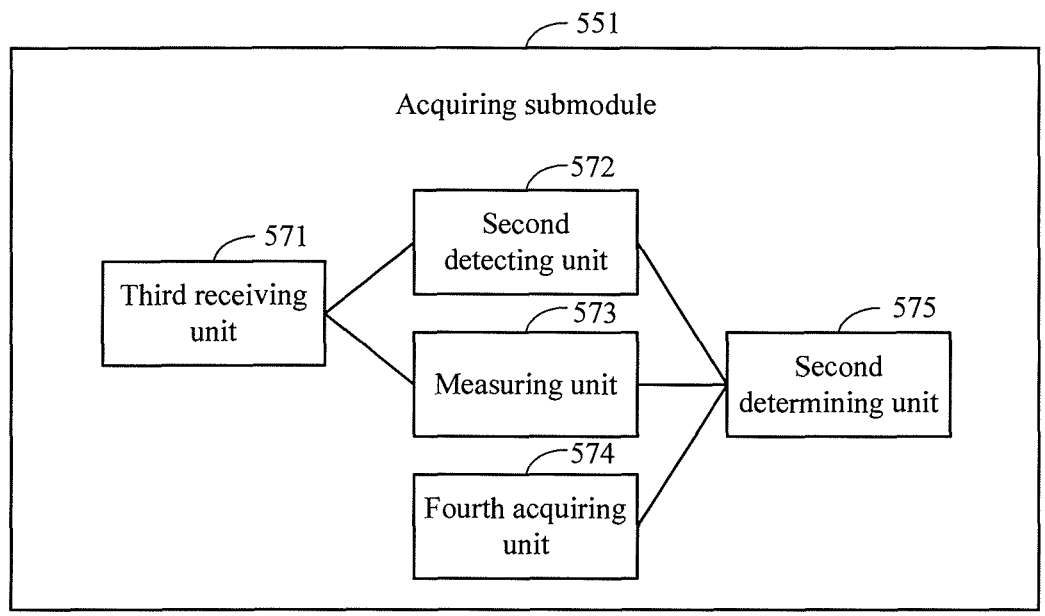
FIG. 12 is a schematic block diagram of an acquiring submodule according to an embodiment of the present invention.

In an embodiment of the present invention, as shown in FIG. 12, optionally, the acquiring submodule 551 includes:

a third receiving unit 571, configured to receive a second correction optical signal carrying ASE noise;

a second detecting unit 572, configured to detect a third alternating current component and a third direct current component of the second correction optical signal;

a measuring unit 573, configured to measure a reference OSNR of the second correction optical signal;

a fourth acquiring unit 574, configured to acquire third modulation information of the second correction optical signal and third correction information corresponding to the third modulation information, where an information type of the third modulation information is the same as the information type of the first modulation information; and a second determining unit 575, configured to determine the receiver parameters according to the third alternating current component, the third direct current component, the reference OSNR, and the third correction information.

In an embodiment of the present invention, optionally, the determining submodule 552 is further configured to:

based on the first alternating current component, the first direct current component, the first correction information, and the receiver parameters, determine the OSNR of the detected optical signal according to the foregoing equations (9) and (10).

The apparatus 500 for detecting an optical signal-to-noise ratio according to the embodiment of the present invention may correspond to an executor of the method for detecting an optical signal-to-noise ratio according to the embodiment of the present invention. In addition, the foregoing and other operations and/or functions of the modules in the apparatus 500 aim to implement processes corresponding to the methods in FIG. 1 to FIG. 6 respectively and are not described herein again for brevity.

Figure 15A:
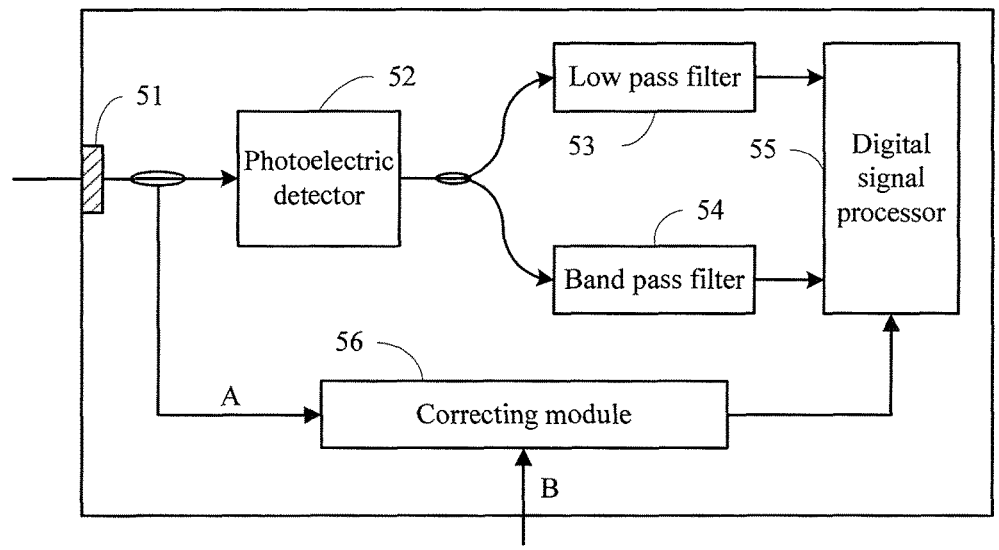
FIG. 15A to FIG. 15E are each still another schematic block diagram of an apparatus for detecting an optical signal-to-noise ratio according to an embodiment of the present invention.

An embodiment of the present invention further provides an apparatus for detecting an optical signal-to-noise ratio. As shown in FIG. 15A, the apparatus includes: an input port 51, a photoelectric detector 52, a low pass filter 53, a band pass filter 54, a digital signal processor 55, and a correcting module 56.

In the embodiment of the present invention, the input port 51 is configured to implement the function of the first receiving module 510 in the foregoing embodiment, that is, receive the detected optical signal carrying ASE noise; the photoelectric detector 52, the low pass filter 53, the band pass filter 54, and the digital signal processor 55 collaborate together to implement the function of the first detecting module 520 in the foregoing embodiment, that is, detect the first alternating current component and the first direct current component of the detected optical signal.

Specifically, the photoelectric detector 52 converts the detected optical signal carrying ASE noise, which is received by the input port 51, into an electric signal. The electric signal is split into two electric signals. The low pass filter 53 filters one electric signal and the digital signal processor 55 processes the signal output by the low pass filter 53 to acquire the first direct current component of the detected optical signal. For a specific process of acquiring, by the digital signal processor 55, the first direct current component of the detected optical signal, reference may be made to the relevant description of the foregoing embodiment, and details are not described herein again. The band pass filter 54 filters the other electric signal and the digital signal processor 55 processes the signal output by the band pass filter 54 to acquire the first alternating current component of the detected optical signal.

The correcting module 56 is configured to implement functions of the first acquiring module 530 and the second acquiring module 540 in the foregoing embodiment, that is, acquire the first modulation information of the detected optical signal, acquire the first correction information corresponding to the first modulation information according to the first modulation information, and then provide the first correction information for the digital signal processor 55. Alternatively, the correcting module 56 in the embodiment includes the first acquiring module 530 and the second acquiring module 540.

Specifically, the correcting module 56 in the embodiment of the present invention may acquire the first modulation information of the detected optical signal in the two ways mentioned in the foregoing embodiment, that is, way 1: acquiring the first modulation information by detecting the high-frequency pilot signal carried in the detected optical signal; and way 2: receiving the control signal sent by the control plane and used to indicate the first modulation information, and acquiring the first modulation information. The way 1 may correspond to a way indicated by an arrow A pointing to the correcting module 56 in FIG. 15A; the way 2 may correspond to a way indicated by an arrow B pointing to the correcting module 56 in FIG. 15A. It should be noted that the correcting module 56 may use either one of the two ways to acquire the first modulation information and is not required to use both of the two ways to acquire the first modulation information. The digital signal processor 55 determines the OSNR of the detected optical signal according to the first correction information and the previously acquired first alternating current component and first direct current component. For a specific process of determining, by the digital signal processor 55, the OSNR of the detected optical signal, reference may be made to the relevant description of the foregoing embodiment, and details are not described herein again.

In the embodiment, a digital signal processor may be used to acquire the first alternating current component and the first direct current component of the detected optical signal and finally determine the OSNR of the detected optical signal. It should be understood that the apparatus for detecting an optical signal-to-noise ratio may also include two digital signal processors. One is configured to acquire the first direct current component and the first alternating current component of the detected optical signal and the other is configured to determine the OSNR of the detected optical signal. The embodiment of the present invention is not limited thereto.

In the apparatus for detecting an optical signal-to-noise ratio shown in FIG. 15A, two filters (the low pass filter 53 and the band pass filter 54) are electric filters and are hardware resources different from the digital signal processor 55, while an apparatus for detecting an optical signal-to-noise ratio that is provided in another embodiment of the present invention (the apparatus in the structure shown in FIG. 15B) does not have any electric filter. Differences between the apparatus for detecting an optical signal-to-noise ratio shown in FIG. 15B and the apparatus for detecting an optical signal-to-noise ratio shown in FIG. 15A lie in that: 1. The apparatus for detecting an optical signal-to-noise ratio shown in FIG. 15B does not have any electric filter (a low pass filter or a band pass filter). 2. In addition to having the function of the digital signal processor in FIG. 15A, a digital signal processor 55 in FIG. 15B has functions of the low pass filter and the band pass filter in FIG. 15A, that is, the digital signal processor 55 implements a filtering function of a filter through signal processing.

Figure 15B:
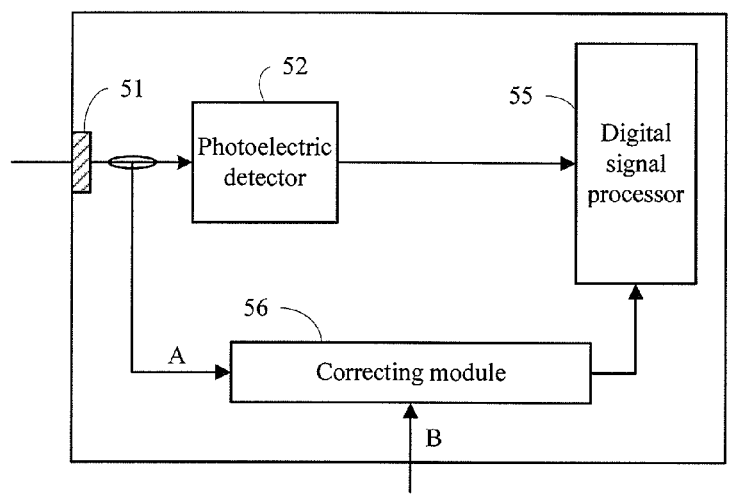

When OSNR detection is performed on a single-wavelength detected optical signal that is received, the apparatus for detecting an optical signal-to-noise ratio shown in FIG. 15A or FIG. 15B can meet a requirement. When a multi-wavelength optical signal is transmitted in a network and an OSNR of each single-wavelength optical signal needs to be detected, although the apparatus for detecting an optical signal-to-noise ratio in the structure shown in FIG. 15A or FIG. 15B can also meet the requirement, an optical filter is preferably configured at each OSNR detection point of the network to acquire one single-wavelength optical signal upon each filtering operation and OSNR detection is performed by the apparatus for detecting an optical signal-to-noise ratio shown in FIG. 15A or FIG. 15B.

Figure 15C:
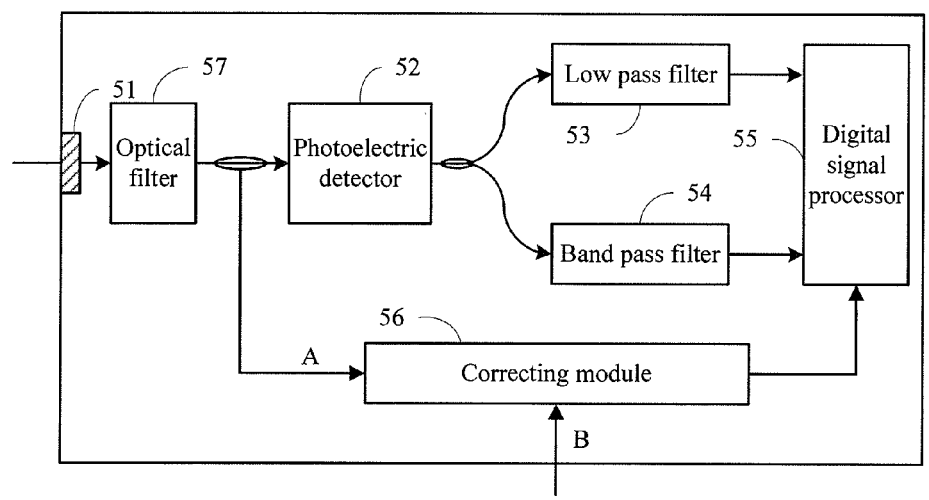

More preferably, yet another embodiment of the present invention provides an apparatus for detecting an optical signal-to-noise ratio and its structure is shown in FIG. 15C. The apparatus for detecting an optical signal-to-noise ratio includes an optical filter and therefore no optical filter needs to be configured at each OSNR detection point. The differences between the apparatus for detecting an optical signal-to-noise ratio in the structure shown in FIG. 15C and the apparatus for detecting an optical signal-to-noise ratio in the structure shown in FIG. 15A lie in that: 1. An optical filter 57 is added in the apparatus for detecting an optical signal-to-noise ratio in the structure shown in FIG. 15C. 2. An optical signal received by an input port 51 in FIG. 15C may be a multi-wavelength optical signal. The optical filter 57 in FIG. 15C may be specifically a TOF, and by adjusting a parameter of the TOF, one single-wavelength optical signal is filtered each time for subsequent OSNR detection. The apparatus for detecting an optical signal-to-noise ratio in the structure shown in FIG. 15C may include two electric filters (a low pass filter 53 and a band pass filter 54). It may be understood that, in other embodiments, an apparatus for detecting an optical signal-to-noise ratio may not be configured with any electric filter but a filtering function of an electric filter is implemented in a digital signal processor through signal processing, which is similar to the apparatus for detecting an optical signal-to-noise ratio shown in FIG. 15B.

In the apparatuses for detecting an optical signal-to-noise ratio shown in FIG. 15A and FIG. 15C, the detected optical signal is first converted into an electric signal, the electric signal is then split into two electric signals, and then, the two electric signals are processed respectively to acquire the first direct current component and the first alternating current component of the detected optical signal. It should be understood that, in apparatuses for detecting an optical signal-to-noise ratio that are provided in other embodiments (for example, apparatuses for detecting an optical signal-to-noise ratio shown in FIG. 15D and FIG. 15E), an optical signal may be first split into two optical signals, the two optical signals are then converted into electric signals respectively, and then, the two electric signals are processed respectively to acquire the first direct current component and the first alternating current component of the detected optical signal. The apparatus for detecting an optical signal-to-noise ratio shown in FIG. 15D includes: an input port 61, a photoelectric detector 62, a photoelectric detector 63, a low pass filter 64, a band pass filter 65, a correcting module 66, and a digital signal processor 67. The foregoing parts are the same as corresponding parts in the apparatus for detecting an optical signal-to-noise ratio shown in FIG. 15A and are not described herein again.

Figure 15D:
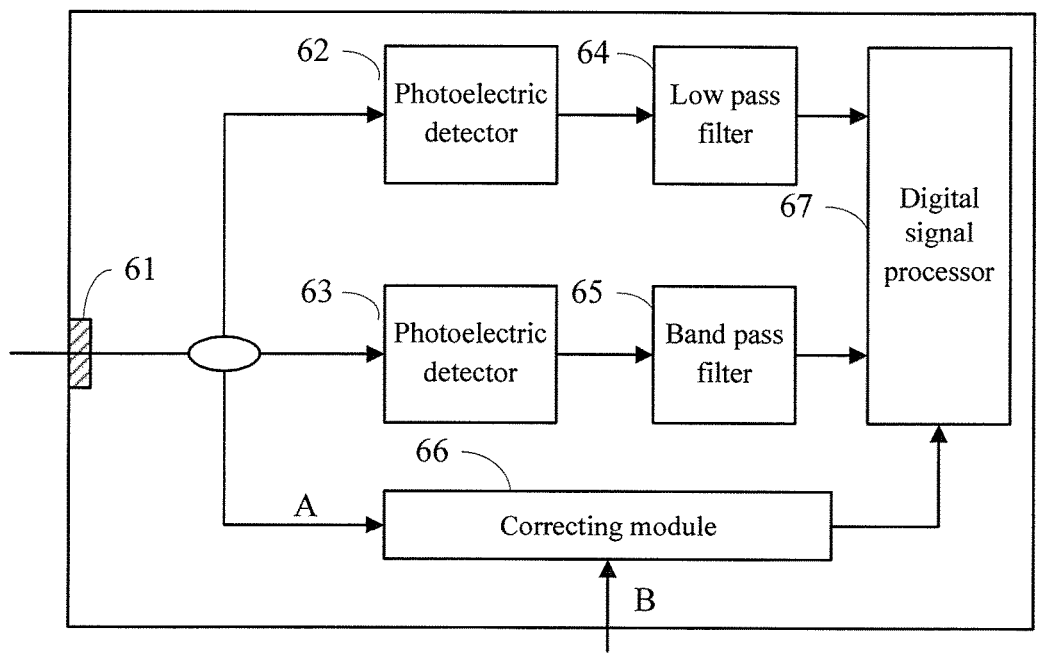
Figure 15E:
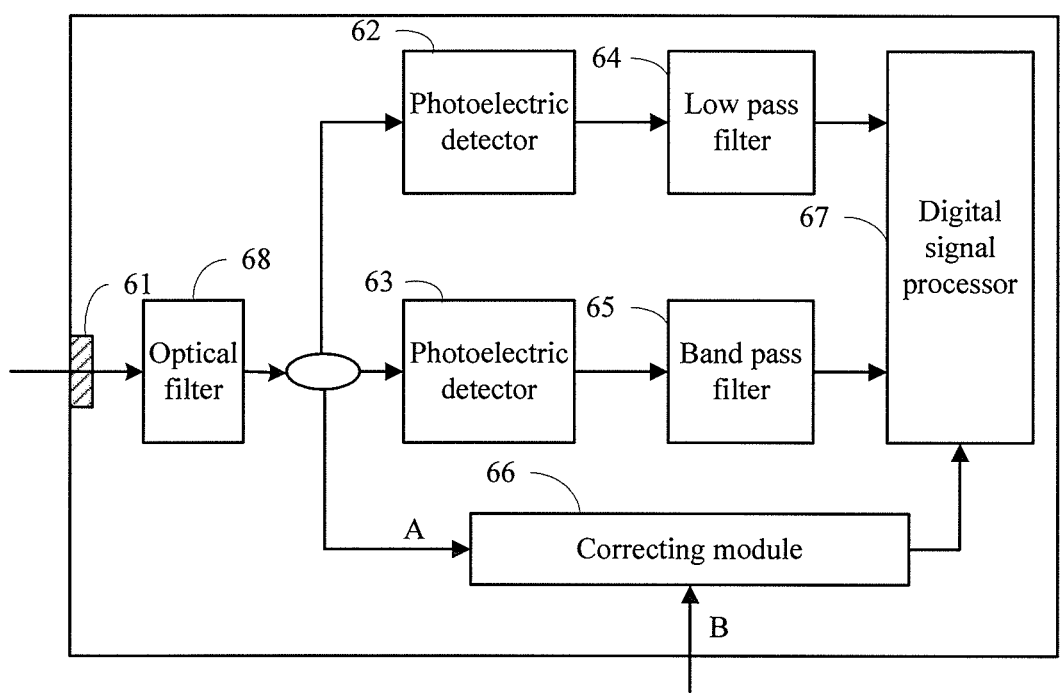

The differences between the apparatus for detecting an optical signal-to-noise ratio shown in FIG. 15E and the apparatus for detecting an optical signal-to-noise ratio shown in FIG. 15D lie in that: 1. An optical filter 68 is added in the apparatus for detecting an optical signal-to-noise ratio shown in FIG. 15E. 2. An optical signal received by an input port 61 in FIG. 15E may be a multi-wavelength optical signal. The optical filter 68 in FIG. 15E may be specifically a TOF, and by adjusting a parameter of the TOF, one single-wavelength optical signal is filtered each time for subsequent OSNR detection.

Although only the previously introduced parts are shown in FIG. 15A to FIG. 15E, a person skilled in the art knows that the apparatuses for detecting an optical signal-to-noise ratio in the structures shown in FIG. 15A to FIG. 15E may further include other parts (not shown in the figures), for example, a splitter, an amplification circuit, and an analog to digital converter. Furthermore, how to configure these parts that are not shown in FIG. 15A to FIG. 15E is a known technology in the art and is not described herein again.

The apparatus for detecting an optical signal-to-noise ratio in the embodiment of the present invention acquires the first correction information corresponding to the first modulation information of the detected optical signal and determines the OSNR of the detected optical signal according to the first correction information. Therefore, the apparatus for detecting an optical signal-to-noise ratio in the embodiment of the present invention has high OSNR detection precision and lays a solid basis for accurately measuring network performance.

Figure 13:
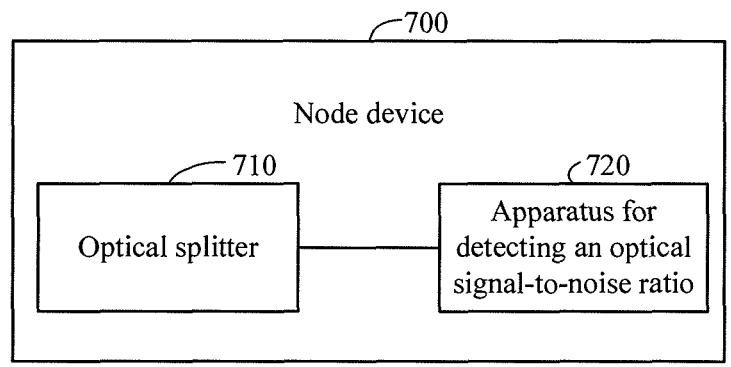
FIG. 13 is a schematic block diagram of a node device according to an embodiment of the present invention.

FIG. 13 is a schematic block diagram of a node device 700 according to an embodiment of the present invention. As shown in FIG. 13, the node device 700 includes an optical splitter 710 and an apparatus 720 for detecting an optical signal-to-noise ratio according to an embodiment of the present invention, where:

the optical splitter 710 is configured to separate a part from an optical signal received by the node device 700 and input the part into the apparatus 720 for detecting an optical signal-to-noise ratio; and the apparatus 720 for detecting an optical signal-to-noise ratio is configured to detect an optical signal-to-noise ratio of the input optical signal, where the input optical signal carries amplified spontaneous emission noise.

The apparatus 720 for detecting an optical signal-to-noise ratio includes:

a first receiving module, configured to receive a detected optical signal carrying amplified spontaneous emission ASE noise;

a first detecting module, configured to detect a first alternating current component and a first direct current component of the detected optical signal;

a first acquiring module, configured to acquire first modulation information of the detected optical signal;

a second acquiring module, configured to acquire first correction information corresponding to the first modulation information according to the first modulation information; and a determining module, configured to determine an OSNR of the detected optical signal according to the first alternating current component, the first direct current component, and the first correction information.

Optionally, the node device 700 in the embodiment of the present invention is an add-drop multiplexing node device, an amplifier node device, or an equalizer node device. It should be understood that the node device 700 may also be any other device, and that the present invention is not limited thereto.

It should be understood that the apparatus 720 for detecting an optical signal-to-noise ratio, which is included in the node device 700 according to the embodiment of the present invention, may correspond to the apparatus 500 for detecting an optical signal-to-noise ratio in the embodiment of the present invention. In addition, the foregoing and other operations and/or functions of the modules in the apparatus 720 for detecting an optical signal-to-noise ratio aim to implement processes corresponding to the methods in FIG. 1 to FIG. 6 respectively and are not described herein again for brevity.

Therefore, the node device in the embodiment of the present invention can improve OSNR detection precision by acquiring the first correction information corresponding to the first modulation information of the detected optical signal and determining the OSNR of the detected optical signal according to the first correction information, thereby accurately measuring network performance.

Figure 14:
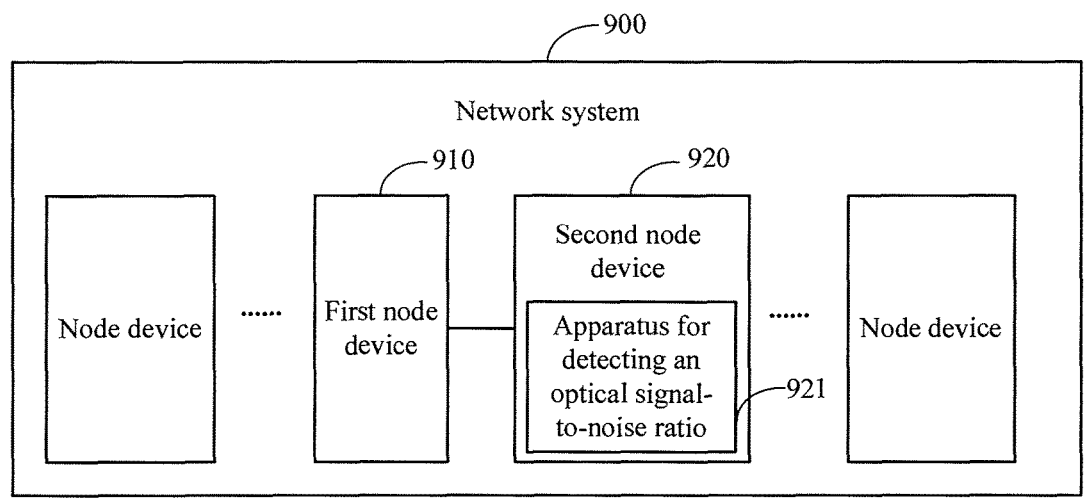
FIG. 14 is a schematic block diagram of a network system according to an embodiment of the present invention.

FIG. 14 is a schematic block diagram of a network system 900 according to an embodiment of the present invention. As shown in FIG. 14, the network system 900 includes at least one first node device 910 and at least one second node device 920 that includes an apparatus 921 for detecting an optical signal-to-noise ratio according to the embodiment of the present invention.

The apparatus 921 for detecting an optical signal-to-noise ratio is configured to detect, on the second node device 920, an optical signal-to-noise ratio of an optical signal sent by the first node device 910, where the optical signal sent by the first node device 910 carries amplified spontaneous emission noise when it reaches the second node device 920.

In the embodiment of the present invention, the first node device may be any node device that can output an optical signal in the network system, for example, the first node device may be a signal generator or the like. The second node device may be any node device that includes the apparatus for detecting an optical signal-to-noise ratio in the embodiment of the present invention in the network system. Optionally, the second node device is an add-drop multiplexing node device, an amplifier node device, or an equalizer node device. It should be understood that the first node device or the second node device may also be any other device, and that the present invention is not limited thereto.

It should be understood that the second node device 920 included in the network system 900 according to the embodiment of the present invention may correspond to the node device 700 in the embodiment of the present invention and that the apparatus 921 for detecting an optical signal-to-noise ratio, which is included in the second node device 920, may correspond to the apparatus 500 for detecting an optical signal-to-noise ratio in the embodiment of the present invention. In addition, the foregoing and other operations and/or functions of the modules in the apparatus 921 for detecting an optical signal-to-noise ratio aim to implement processes corresponding to the methods in FIG. 1 to FIG. 6 respectively and are not described herein again for brevity.

Therefore, the network system in the embodiment of the present invention can improve OSNR detection precision by acquiring the first correction information corresponding to the first modulation information of the detected optical signal and determining the OSNR of the detected optical signal according to the first correction information, thereby accurately measuring network performance.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for detecting an optical signal-to-noise ratio, the method comprising:
    receiving an optical signal carrying amplified spontaneous emission (ASE) noise;
    detecting a first alternating current component and a first direct current component of the optical signal; wherein the optical signal is converted into an electric signal through a photoelectric detector in an optical receiver, the electric signal output by the photoelectric detector is split into two electric signals, one electric signal is sent to a low pass filter (LPF) for signal processing to acquire the first direct current component of the optical signal, the other electric signal is sent to a band pass filter (BPF) for signal processing to acquire the first alternating current component of the optical signal;
    acquiring first modulation information of the optical signal;
    acquiring first correction information corresponding to the first modulation information according to the first modulation information; and
    determining an optical signal-to-noise ratio (OSNR) of the optical signal according to the first alternating current component, the first direct current component, and the first correction information.

2. The method according to claim 1, wherein acquiring first modulation information of the optical signal comprises:
    acquiring the first modulation information according to a high-frequency pilot signal carried in the optical signal.

3. The method according to claim 1, wherein acquiring first modulation information of the optical signal comprises:
    receiving a control signal sent by a control plane and used to indicate the first modulation information; and
    acquiring the first modulation information according to the control signal.

4. The method according to claim 3, further comprising:
    establishing a correspondence table of modulation information and correction information, wherein an information type of the modulation information is the same as an information type of the first modulation information; and
    wherein acquiring first correction information corresponding to the first modulation information comprises:
    acquiring, according to the first modulation information, the first correction information by querying the correspondence table.

5. The method according to claim 4, wherein establishing a correspondence table of modulation information and correction information comprises:
    respectively receiving a first correction optical signal not carrying ASE noise, wherein at least one correction optical signal in the first correction optical signal has the first modulation information;
    detecting a second alternating current component and a second direct current component of each correction optical signal in the first correction optical signal;

acquiring second modulation information of each correction optical signal, wherein an information type of the second modulation information is the same as the information type of the first modulation information;

determining second correction information corresponding to the second modulation information according to the second alternating current component and the second direct current component; and establishing the correspondence table according to the second modulation information and the second correction information.

6. The method according to claim 5, wherein determining an optical signal-to-noise ratio (OSNR) of the optical signal according to the first alternating current component, the first direct current component, and the first correction information comprises:

acquiring receiver parameters corresponding to a receiver that receives the optical signal; and determining the OSNR of the optical signal according to the first alternating current component, the first direct current component, the receiver parameters, and the first correction information.

7. The method according to claim 6, wherein acquiring receiver parameters corresponding to a receiver that receives the optical signal comprises:

receiving a second correction optical signal carrying ASE noise;

detecting a third alternating current component and a third direct current component of the second correction optical signal;

measuring a reference OSNR of the second correction optical signal;

acquiring third modulation information of the second correction optical signal and third correction information corresponding to the third modulation information, wherein an information type of the third modulation information is the same as the information type of the first modulation information; and determining the receiver parameters according to the third alternating current component, the third direct current component, the reference OSNR, and the third correction information.

8. The method according to claim 6, wherein determining the OSNR of the optical signal comprises:

based on the first alternating current component, the first direct current component, the first correction information, and the receiver parameters, determining the OSNR of the optical signal according to the following equations:

$$S = \frac{2\alpha_1 P_s^2}{R}\left(\frac{1}{OSNR} + \frac{B_0}{2R \cdot OSNR^2}\right) + \beta \cdot P_s^2 + \gamma \text{ and}$$

$$E = \alpha_2 \cdot P_s\left(1 + \frac{1}{OSNR} \cdot \frac{B_0}{R}\right);$$

wherein R and $B_0$ are constants; $P_s$ indicates signal power in the optical signal; S indicates the first alternating current component; E indicates the first direct current component; $\beta$ and $\gamma$ indicate the first correction information; and $\alpha_1$ and $\alpha_2$ indicate the receiver parameters.

9. The method according to claim 1, wherein the first modulation information comprises at least one of the following information types: a modulation format, a bit rate, start and end positions of a spectrum of an optical signal, and a spectrum bandwidth occupied by an optical signal.

10. An apparatus for detecting an optical signal-to-noise ratio (OSNR), comprising:

a first receiving module, configured to receive an optical signal carrying amplified spontaneous emission (ASE) noise;

a first detecting module, configured to detect a first alternating current component and a first direct current component of the optical signal; wherein the optical signal is converted into an electric signal through a photoelectric detector, the electric signal output by the photoelectric detector is split into two electric signals, one electric signal is sent to a low pass filter (LPF) for signal processing to acquire the first direct current component of the optical signal, the other electric signal is sent to a band pass filter (BPF) for signal processing to acquire the first alternating current component of the optical signal;

a first acquiring module, configured to acquire first modulation information of the optical signal;

a second acquiring module, configured to acquire first correction information corresponding to the first modulation information according to the first modulation information; and a determining module, configured to determine an optical signal-to-noise ratio (OSNR) of the optical signal according to the first alternating current component, the first direct current component, and the first correction information.

11. The apparatus according to claim 10, wherein the first acquiring module comprises:

a first acquiring unit, configured to acquire the first modulation information according to a high-frequency pilot signal carried in the optical signal.

12. The apparatus according to claim 10, wherein the first acquiring module comprises:

a first receiving unit, configured to receive a control signal sent by a control plane and used to indicate the first modulation information; and a first acquiring unit, configured to acquire the first modulation information according to the control signal.

13. The apparatus according to claim 12, further comprising:

an establishing module, configured to establish a correspondence table of modulation information and correction information, wherein an information type of the modulation information is the same as an information type of the first modulation information; and wherein the second acquiring module is further configured to acquire, according to the first modulation information, the first correction information by querying the correspondence table.

14. The apparatus according to claim 13, wherein the establishing module comprises:

a second receiving unit, configured to respectively receive a first correction optical signal not carrying ASE noise, wherein at least one correction optical signal in the first correction optical signal has the first modulation information;

a first detecting unit, configured to detect a second alternating current component and a second direct current component of each correction optical signal in the first correction optical signal;

a second acquiring unit, configured to acquire second modulation information of each correction optical signal, wherein an information type of the second modulation information is the same as the information type of the first modulation information;

a first determining unit, configured to determine second correction information corresponding to the second modulation information according to the second alternating current component and the second direct current component; and an establishing unit, configured to establish the correspondence table according to the second modulation information and the second correction information.

15. The apparatus according to claim 14, wherein the determining module comprises:
   an acquiring submodule, configured to acquire receiver parameters corresponding to a receiver that receives the optical signal; and
   a determining submodule, configured to determine the OSNR of the optical signal according to the first alternating current component, the first direct current component, the receiver parameters, and the first correction information.

16. The apparatus according to claim 15, wherein the acquiring submodule comprises:
   a third receiving unit, configured to receive a second correction optical signal carrying ASE noise;
   a second detecting unit, configured to detect a third alternating current component and a third direct current component of the second correction optical signal;
   a measuring unit, configured to measure a reference OSNR of the second correction optical signal;
   a third acquiring unit, configured to acquire third modulation information of the second correction optical signal and third correction information corresponding to the third modulation information, wherein an information type of the third modulation information is the same as the information type of the first modulation information; and
   a second determining unit, configured to determine the receiver parameters according to the third alternating current component, the third direct current component, the reference OSNR, and the third correction information.

17. The apparatus according to claim 15, wherein the determining submodule is configured to:
   based on the first alternating current component, the first direct current component, the first correction information, and the receiver parameters, determine the OSNR of the optical signal according to the following equations:

$$S = \frac{2\alpha_1 P_s^2}{R}\left(\frac{1}{OSNR} + \frac{B_0}{2R \cdot OSNR^2}\right) + \beta \cdot P_s^2 + \gamma \text{ and}$$

-continued
$$E = \alpha_2 \cdot P_s\left(1 + \frac{1}{OSNR} \cdot \frac{B_0}{R}\right);$$

wherein R and $B_0$ are constants; $P_s$ indicates signal power in the optical signal; S indicates the first alternating current component; E indicates the first direct current component; β and γ indicate the first correction information; and $\alpha_1$ and $\alpha_2$ indicate the receiver parameters.

18. The apparatus according to claim 10, wherein the first modulation information comprises at least one of the following information types: a modulation format, a bit rate, start and end positions of a spectrum of an optical signal, and a spectrum bandwidth occupied by the optical signal.

19. A node device, comprising:
   an optical splitter;
   an apparatus for detecting an optical signal-to-noise ratio (OSNR) comprising:
      a first receiving module, configured to receive an optical signal carrying amplified spontaneous emission (ASE) noise;
      a first detecting module, configured to detect a first alternating current component and a first direct current component of the optical signal; wherein the optical signal is converted into an electric signal through a photoelectric detector, the electric signal output by the photoelectric detector is split into two electric signals, one electric signal is sent to a LPF (low pass filter) for signal processing to acquire the first direct current component of the optical signal, the other electric signal is sent to a BPF (band pass filter) for signal processing to acquire the first alternating current component of the optical signal;
      a first acquiring module, configured to acquire first modulation information of the optical signal;
      a second acquiring module, configured to acquire first correction information corresponding to the first modulation information according to the first modulation information; and
      a determining module, configured to determine an optical signal-to-noise ratio (OSNR) of the optical signal according to the first alternating current component, the first direct current component, and the first correction information;
   wherein the optical splitter is configured to separate a part from an optical signal received by the node device and input the part into the apparatus for detecting an OSNR; and
   wherein the apparatus for detecting an OSNR is configured to detect an optical signal-to-noise ratio of the input optical signal, wherein the input optical signal carries amplified spontaneous emission (ASE) noise.

* * * * *